United States Patent [19]

Tsuyama

[11] Patent Number: 4,985,929
[45] Date of Patent: Jan. 15, 1991

[54] SYSTEM FOR USE IN PROCESSING A SPEECH BY THE USE OF STENOGRAPHS

[76] Inventor: Chizuko Tsuyama, 1-21-17, Asagaya-minami, Suginami-ku, Tokyo, Japan

[21] Appl. No.: 218,475

[22] Filed: Jul. 6, 1988

Related U.S. Application Data

[63] Continuation of Ser. No. 651,281, Sep. 17, 1984, abandoned.

[51] Int. Cl.$^5$ ............................................. G06K 9/20
[52] U.S. Cl. .................................... 382/48; 382/1; 382/8; 382/13; 178/21
[58] Field of Search .................... 382/1, 8, 48; 178/21

[56] References Cited

U.S. PATENT DOCUMENTS

| 3,557,927 | 1/1971 | Wright et al. | 178/21 |
| 3,665,115 | 5/1972 | Snook | 178/21 |
| 4,369,431 | 1/1983 | Howbrook | 340/146.3 |

FOREIGN PATENT DOCUMENTS

| 2087616 | 5/1982 | United Kingdom. |
| 2117154 | 10/1983 | United Kingdom. |
| 2909154 | 9/1980 | Fed. Rep. of Germany. |
| 1231220 | 9/1973 | Fed. Rep. of Germany. |
| 1549766 | 9/1972 | Fed. Rep. of Germany. |

Primary Examiner—Michael Razavi
Attorney, Agent, or Firm—Frishauf, Holtz, Goodman & Woodward

[57] ABSTRACT

A speech is processed by instantaneously converting sounds of the speech into a sequence of stenographs which are read in the form of first electric signals representative of the stenographs. The first electric signals are further converted into second electric signals representative of words corresponding to the sounds. The second electric signals are successively displayed on a display unit to provide visual displays indicative of the words. The visual displays may be either copied on a sheet by the use of a copying machine or printed on a recording sheet by the use of a printer.

6 Claims, 3 Drawing Sheets

FIG.1(a)  FIG.1(b)
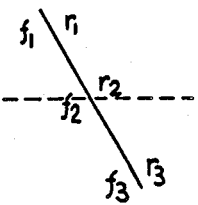
FIG.1(e)
FIG.1(c)  FIG.1(d)
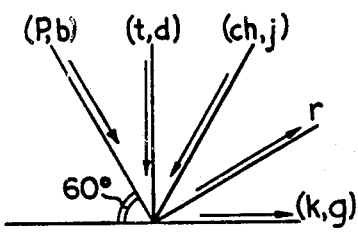
FIG.2(a)
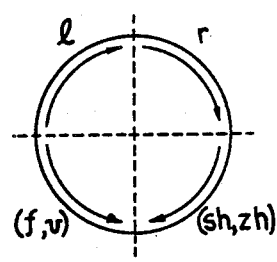
FIG.2(b)
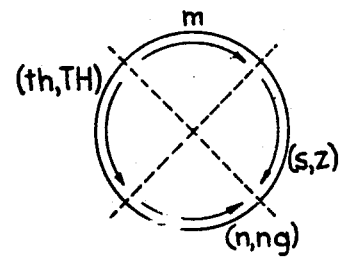
FIG.2(c)
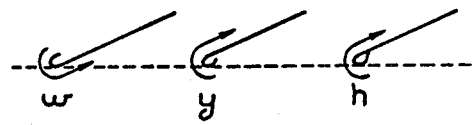
FIG.2(d)

SYSTEM FOR USE IN PROCESSING A SPEECH BY THE USE OF STENOGRAPHS

This application is a continuation of application Ser. No. 651,281, filed Sept. 17, 1984 now abandoned.

BACKGROUND OF THE INVENTION

This invention relates to a speech processing system for use in processing a speech and to a device therefor.

Recently, international conferences have often been held with participants attending them from various countries. In the international conferences, it is of great importance to promote a mutual understanding among the participants. However, it frequently happens that a part of the participants can speak languages designated for the conferences and the remaining participants can not speak the designated languages. Under the circumstances, the remaining participants can not accurately and clearly understand the speech and can not respond thereto.

It is mentioned here that written words or sentences can often be understood even by the participants who can not speak the designated languages. Therefore, proceedings or procedures can be expedited in the conferences if each speech of speakers can instantaneously be displayed in the form of written words or sentences. Moreover, a mutual understanding can considerably be promoted among the participants if a record of the proceedings can be gotten simultaneously with completion of the conference.

Consideration might be made about the use of so-called conventional speech recognition devices so as to convert each speech of speakers into words or sentences. However, all of the conventional recognition devices can recognize only specific words spoken by a specific speaker or speakers. Anyway, it is very difficult to recognize a great number of words spoken by unspecified persons for the time being.

SUMMARY OF THE INVENTION

It is an object of this invention to provide a speech processing system wherein a great number of words spoken by unspecified persons can be visually displayed in the form of words or sentences substantially simultaneously with a speech.

It is another object of this invention to provide a speech processing system of the type described, which serves to expedite proceedings of international conferences.

It is a specific object of this invention to provide a speech processing system of the type described, wherein a record of proceedings can be readily obtained at the end of each conference.

It is another object of this invention to provide a device for use in the speech processing system.

A speech processing system to which this invention is applicable is for use in processing a speech composed of a succession of sounds. According to this invention, the speech processing system comprises first conversion means for successively converting the sound succession into stenographs to produce a succession of stenograph signals representative of the stenographs and second conversion means for converting the stenograph signals into word signals which are representative of words corresponding to the stenographs.

According to another aspect of this invention, a stenograph processing device is for use in processing stenographs written down on a medium. The stenograph processing device comprises reading means for reading the stenographs from the medium to produce electric signals representative of the stenographs and processing means for processing the electric signals to detect words corresponding to the electric signals and to produce word signals representative of the words.

BRIEF DESCRIPTION OF THE DRAWING

FIGS. 1(a) through (e) show symbols for use in describing the Pitman shorthand system as an example;

FIGS. 2(a) through (d) show other symbols for use in describing the Pitman shorthand system as an example;

DESCRIPTION OF THE PREFERRED EMBODIMENTS

PRINCIPLE OF THE INVENTION

Figure 3:
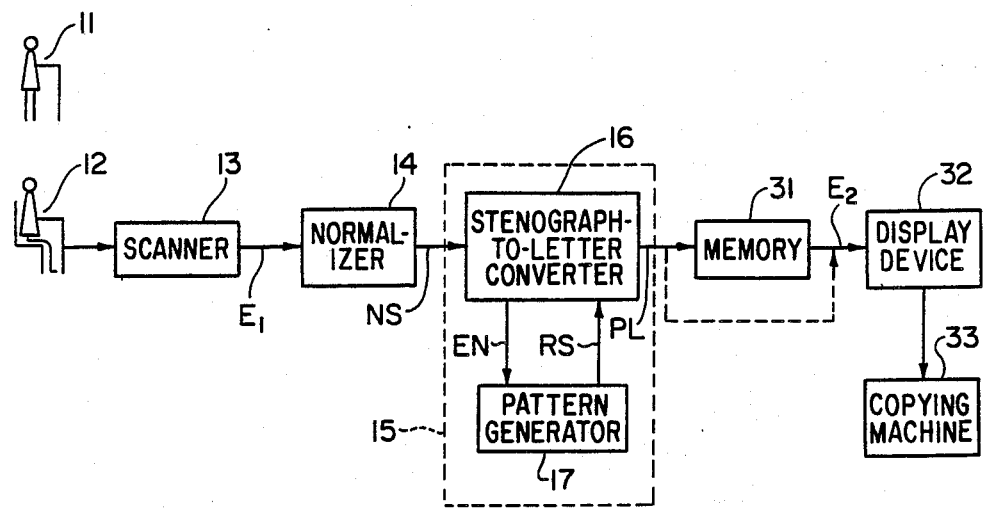
FIG. 3 shows a block diagram of a speech processing system according to a preferred embodiment of this invention.

Referring to FIGS. 1 and 2, a principle of this invention resides in converting a speech composed of a succession of sounds, such as phones, phonemes, syllables, and the like, into stenographs by the use of shorthand written on a recording medium and thereafter in further converting the stenographs into words which are to be visually displayed. By way of example, description will be made about the Pitman shorthand having a high regularity. With the Pitman shorthand, each sound is written down by the use of predetermined stenographs in a manner to be described. A single sound or sounds are written down in the form of a single or a combination of the stenographs of the Pitman shorthand.

Herein, let description be made about the stenographs, namely, symbols representative of vowels and consonants so as to facilitate an understanding of the Pitman shorthand. The vowels are classified into six-kinds of short vowels a, e, i, o, u, and oo and six-kinds of long vowels composed of ah, $\bar{a}$, $\bar{ee}$, $\bar{aw}$, $\bar{o}$, and $\bar{oo}$.

On the other hand, four sorts of signs or symbols are prepared in the Pitman shorthand to represent the twelve vowels. Specifically, three (a, e, and i) of the short vowels are represented by a light dot illustrated in FIG. 1(a) while the remaining short vowels o, u, and oo) are represented by a light dash illustrated in FIG. 1(b). Likewise, three (ah, $\bar{a}$, and $\bar{ee}$) of the long vowels are represented by a heavy dot illustrated in FIG. 1(c) while the remaining long vowels ($\bar{aw}$, $\bar{o}$, and $\bar{oo}$) are represented by a heavy dash illustrated in FIG. 1(d).

Under the circumstances, each of the short and the long vowels can not be individually specified by the above-mentioned signs. However, each vowel can individually be specified in connection with consonants succeeding or preceding each vowel in a manner to be presently described.

In FIG. 1(e), a ruled or reference line is shown by a broken line. Each of the vowel signs and consonant signs (to be described later) is written with reference to the ruled line, although the ruled line is not always drawn visually. The exemplified oblique thin sign or stroke is representative of a consonant P and has a front part and a rear part on the lefthand and the righthand sides of the thin stroke, respectively. The illustrated stroke may therefore be called a consonant sign P. The front part is divided into first, second, and third front places depicted at $f_1$, $f_2$, and $f_3$, respectively. Similarly, the rear part is divided into first, second, and third rear places depicted at $r_1$, $r_2$, and $r_3$, respectively.

Antecedence of each vowel to an adjacent consonant is indicated by assigning each vowel sign to a front part of each consonant sign. To the contrary, subsequence of each vowel after the adjacent consonant is indicated by allocating each vowel sign to a rear part of each consonant sign. In addition, the first through the third front places or the first through the third rear places serve to individually specify three sorts of the vowels, such as (a, e, i); (o, u, oo); (ah, ā, ee; and (aw, ō, ōo).

By way of example, an indication of the light dot (FIG. 1(a)) attached to the first rear place $r_1$ of the consonant sign P denotes a sound "pa" as one of the sounds. Similarly, indications of the light dots located at the second and the third rear places $r_2$ and $r_3$ of the consonant sign P denote sounds "pe" and "pi", respectively. Likewise, indications of the light dash (FIG. 1(b)) located at the first through the third rear places $r_1$ to $r_3$ denote sounds "po", "pu", and "poo", respectively.

In addition, indications of the heavy dots (FIG. 1(c)) located at the first through the third rear places $r_1$ to $r_3$ of the consonant sign P denote sounds "pah", "pā", and "pee", respectively, while indications of the heavy dash (FIG. 1(d)) located at the first through the third rear places $r_1$ to $r_3$ of the consonant sign P denote sounds "paw", "pē", and "pōo, respectively.

Symbols or signs illustrated in FIGS. 2(a) through (d) represent consonants attached thereto. Arrows are also attached to the respective symbols to show an order of writing which is important to define the first through the third places of each symbol, as mentioned in conjunction with FIG. 1. It is to be noted as regards the specific symbols that each pair of voiceless and voiced consonants, such as (p, b); (t, d); (ch, j); (k, g); (sh, zh); (th, TH); (s, z); and (n, ng) is assigned to each of the specific symbols. It is possible to distinguish the voiceless consonant of each pair and the voiced consonant thereof by thin and thick outlines of each specific symbols, respectively.

The symbols are divided into straight strokes (FIG. 2(a)), curved strokes (FIGS. 2(b) and (c)), and specially formed upstrokes (FIG. 2(d)). The straight strokes are also subdivided into straight downstrokes, a straight upstroke, and straight horizontal strokes. Likewise, the curved strokes are subdivided into a curved upstroke (l), curved horizontal strokes (m, n, and ng), and the remaining curved downstrokes.

In addition to the above-mentioned symbols, various types of symbols, are defined as stenographs in the Pitman shorthand to specify diphthongs, triphones, and the phrases which frequently appear in each speech. For convenience of description, the vowels, the consonants, the diphthongs, the triphones, and the phrases can be represented by independent stenographs, they will be collectively called sounds, respectively.

Embodiments

Referring to FIG. 3, a speech processing system according to a preferred embodiment of this invention is for use in converting a speech or talk of a speaker 11 into a succession of words to be visually displayed. More specifically, the speech is composed of a succession of sounds and is written down by a stenographer 12 at a high speed on a recording medium (not shown in FIG. 3) in the form of a succession of stenographs as described in conjunction with FIGS. 1 and 2. Anyway, the stenographs are phonetically indicative of the sounds, respectively, and are successively sent to a stenograph processor.

The stenograph processor comprises a scanner 13 for reading the stenographs written down on the recording medium. The scanner 13 may be known in the art and optically scans the stenographs to produce a sequence of first electric signals $E_l$ representative of the stenographs, respectively. The first electric signal sequence may be called a sequence of stenograph signals.

The first electric signal succession $E_l$ is supplied to a normalizer 14 which is for normalizing each of the first electric signals $E_l$. As a result, each of the stenographs is normalized in size, dots, dashes, strokes, and the like. Such normalization is possible by the use of a comparatively simple electric circuit because the rule of the Pitman shorthand is strictly determined and the stenographer should write the stenographs in accordance with the strict shorthand rule. In other words, the stenographs are written down with less variation in comparison with manuscript letters or characters.

At any rate, the normalizer 14 supplies a processing unit 15 with a succession of normalized signals NS representative of the stenographs and serves to preliminarily process the first electric signals $E_l$. The normalizer 14 may be a part of the processing unit 15.

It should be noted here that the stenographs are phonetic signs which can be converted into phonetic letters, such as the alphabets, and that the converted letters are not always indicative of correct spelling of each word spoken by the speaker. For example, words "knee" and "bowl" are represented in the form of the phonetic letters "n-ee" and "b-oh-l", respectively.

Under the circumstances, the processor 15 converts the stenographs represented by the normalized signals NS into the corresponding phonetic letters to produce a sequence of phonetic letter signals PL representative of the phonetic letters. For this purpose, the processing unit 15 comprises a stenograph-to-letter converter 16 operable in cooperation with a pattern generator 17 in a manner to be described. The pattern generator 17 stores a predetermined number of reference patterns which specify the stenographs described with reference to FIGS. 1 and 2.

In the Pitman shorthand system, seven hundred common words are identified from a statistical investigation of a great many documents, as is known among stenographers.

It is also known that about 75% to 80% of the English language can be covered by these seven-hundred of common words which are frequently used. Accordingly, it is possible to cover about 75% to 80% of an English speech by selecting the seven-hundred of common words. Taking the above into account, the reference patterns may preferably include patterns for these common words in addition to patterns for vowels, consonants, short forms, and the like. The predetermined number of the reference patterns is equal to 2000 or so.

Responsive to the normalized signal NS, the stenograph-to-letter converter 16 produces an enable signal EN to access the pattern generator 17. Supplied with the enable signal EN, the pattern generator 17 successively produces a reference pattern signal RS representative of each reference pattern. Each reference pattern signal RS is compared or collated with the normalized signal EN in the stenograph-to-letter converter 16. When coincidence is detected between the normalized signal EN and a specific one of the reference pattern signals RS, the specific reference pattern signal is produced as the phonetic letter signal PL.

From the above, it is readily understood that the pattern generator 17 may be a read-only-memory or a programmable read-only-memory.

Figure 4:
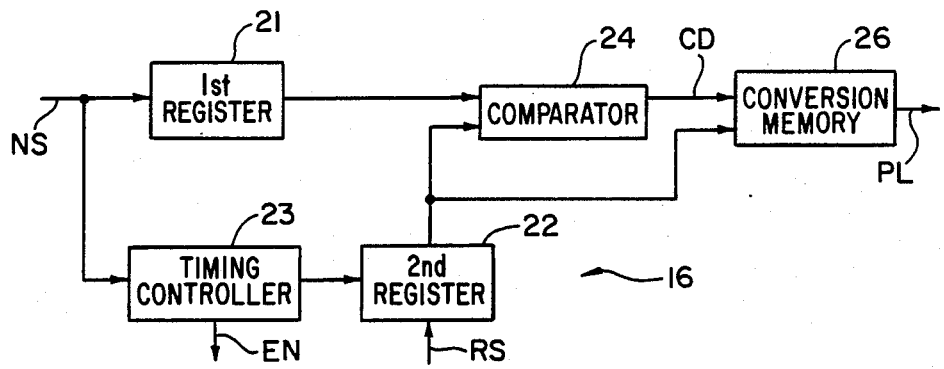
FIG. 4 shows a block diagram of a part of the speech processing system illustrated in FIG. 3.

Temporarily referring to FIG. 4, the stenograph-to-letter converter 16 comprises first and second registers 21 and 22 for storing a current one of the normalized signals NS and each of the reference pattern signals RS, respectively. Responsive to each normalized signal NS, a timing controller 23 delivers the enable signal EN to the pattern generator 17. Each of the reference pattern signals RS is sent from the pattern generator 17 and kept in the second register 22.

A comparator 24 is coupled to the first and the second registers 21 and 22 to compare the current normalized signal NS with each of the reference pattern signals RS successively sent to the second register 22. Such comparison is carried out under control of the timing controller 23. When the current normalized signal NS is coincident with the specific reference pattern signal RS, the comparator 24 supplies a conversion memory 26 with a coincidence signal CD representative of coincidence between the normalized and the reference pattern signals NS and RS.

The conversion memory 26 is accessed by the specific reference pattern signal and the coincidence signal CD to produce a specific one of the phonetic letter signals PL. The conversion memory 26 may be supplied with the current normalized signal instead of each of the reference pattern signals RS.

It should be recollected that the phonetic letter signals PL represent the phonetic letters which may be different in spelling from the corresponding words.

Turning back to FIG. 3, each of the phonetic letter signals PL is delivered to a memory 31 so as to convert the phonetic letters into the corresponding words. The memory 31 stores word signals representative of the words in a plurality of addresses, respectively. Thus, each of the phonetic letter signals PL is supplied to the memory 31 as an address signal for specifying each address of the memory 31. Accessed by each of the phonetic letter signals PL, the memory 31 derives a specific one of the word signals from a specific one of the addresses specified by each phonetic letter signal PL and produces the specific word signal as each of second electric signals $E_2$.

If the memory 31 stores no word signal corresponding to a particular one of the phonetic letter signals, the particular phonetic letter signal may directly be produced as one of the second electric signals $E_2$, as symbolized by a broken line. In addition, when a homonym is represented by a selected one of the phonetic letters, a plurality of words may be derived from the memory 31 in correspondence to the homonym to be produced as the second electric signals $E_2$. If it is possible in each conference to define one word corresponding to the homonym, such one word alone may be produced from the memory 31. This applies to the case where only a single one of the words corresponding to a homonym is frequently spoken in a conference.

Each of the second electric signals $E_2$ is successively visually displayed on a display device 32 in the form of a sequence of words. The display device 32 may be coupled to a copying machine 33 for copying visual displays on a copy sheet. Thus, the speech of the speaker 11 is momentarily visually displayed on the display unit 32 by reading stenographs written down on the recording medium 41. With this structure, it is possible to promote a mutual understanding among participants attending a conference. Moreover, proceedings can be obtained by copying the visual displays on the display unit 32.

Figure 5:
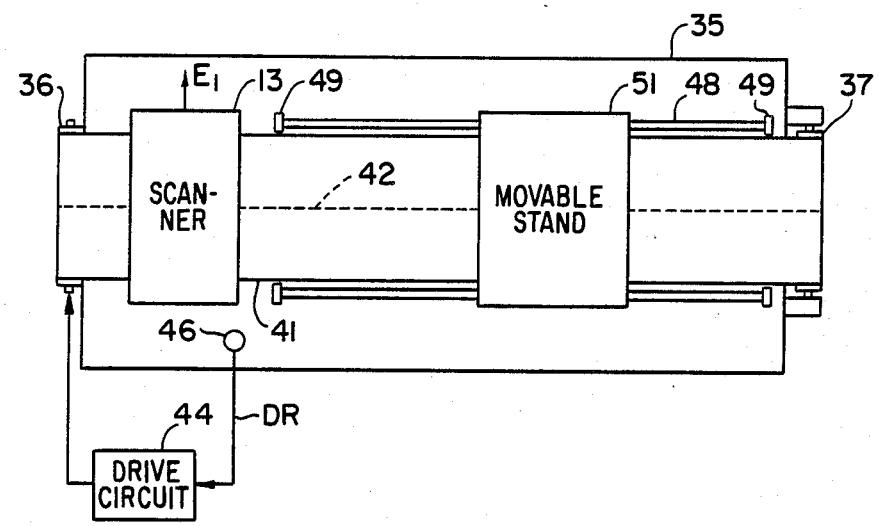
FIG. 5 shows a schematic plan view of an input device for use in the speech processing system illustrated in FIG. 3.

Referring to FIG. 5, an input device is for use in combination with the scanner 13 to draw stenographs and is operated by the stenographer 12 (FIG. 3). In the example being illustrated, the input device comprises a desk 35 for the stenographer (not shown in this FIGURE), a drive roll 36 fixed to the leftside end of the desk 35, and an idler roll 37 fixed to the righthand side of the desk 35 and spaced apart from the drive roll 36.

A recording medium 41 is laid between the idler roll 37 and the drive roll 36 along a transport direction. A ruled line 42 is drawn at a center portion of the illustrated recording medium 41 along the transport direction. However, the ruled line 42 may not be drawn on the recording medium 41 if the center portion of the recording medium 41 can be indicated optically or the like. The recording medium 41 is set or threaded on the idler roll 37 at one end of the medium and anchored to the drive roll 36 at the other end thereof. The recording medium 41 is transported from the idler roll 37 to the drive roll 36 and taken up by the drive roll 36 when the drive roll 36 is driven in a manner to be described later.

The drive roll 36 is coupled through a drive circuit 44 to a push-button switch 46 which is placed on the desk 35 and which is manually operated. The illustrated scanner 13 is located adjacent to the drive roll 36.

A pair of tracks 48 runs between the scanner 13 and the idler roll 37 in parallel to each other along the transport direction. Each of the tracks 48 is terminated by a pair of stoppers 49 adjacent to the scanner 13 and the idler roll 37. A movable stand 51 is carried on the tracks 48 and movable along the tracks 48 leftwards or rightwards of this FIGURE. The stenographer places his or her hand on the movable stand 51 and writes down a succession of stenographs on the recording medium 41 with reference to the ruled line 42, moving the stand 51 rightwards of this FIGURE.

In view of easiness of writing, it is preferable that the recording medium 41 is in close vicinity of the stenographer's hand. Therefore, a design is made so that a distance between a plane of the recording medium 41 and a plane of the stand 51 becomes as short as possible.

Let a certain stenographer hear a speech of a speaker on a conference and write down stenographs corresponding to the speech on the recording medium 41. In this event, the stenographer places his or her hand on the movable stand 51 and successively moves the stand 51 from the lefthand side of this FIGURE towards the righthand stopper 49, the stenographer depresses the push-button switch 46. A drive signal DR is sent from the push-button switch 46 to the drive circuit 44 comprising a motor. As a result, the drive circuit 44 drives the drive roll 36 to move the recording medium 41 through the scanner 13 leftwards of this FIGURE and to take up the recording medium 41 on the drive roll 36.

The stenographs written down on the recording medium 41 are read out of the recording medium 41 by the scanner 13 when the recording medium 41 passes through the scanner 13. Thus, the first electric signals $E_l$ are sent from the scanner 13 to the normalizer 14 (FIG. 3). In the example being illustrated, the drive roll 36 is driven during depression of the push-button switch 46. When depression of the push-button switch 46 is released by the stenographer and the stand 51 is moved leftwards of this FIGURE, the stenographer again writes down stenographs on the recording medium 41.

With this structure, the recording medium 41 is intermittently moved by the stenographer while he or she fails to describe the stenographs. In other words, the stenographs are described only when the recording medium 41 is not moved. This means that the stenographer can stably describe accurate stenographs.

Figure 6:
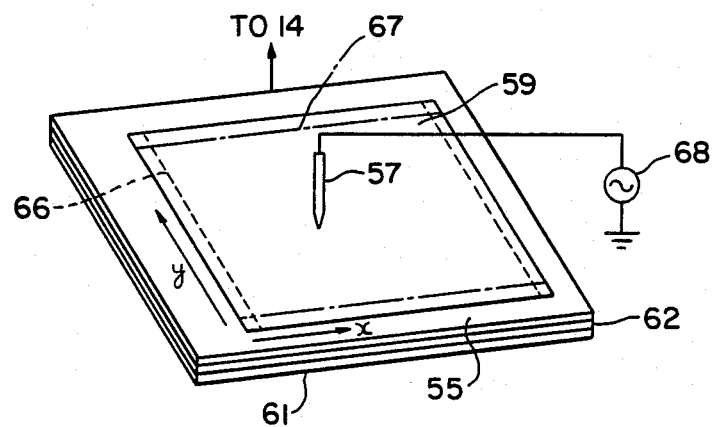
FIG. 6 shows a schematic perspective view of another input device for use in the speech processing system illustrated in FIG. 3.

Referring to FIG. 6, another input device is for use in converting manuscript stenographs into the first electric signals $E_l$ (FIG. 3) and is known as a digitizer. Such a digitizer comprises a tablet 55 and an input pen 57 cooperating with the tablet 55. More particularly, the tablet 55 has a plane 59 on which x- and y-axes are defined. When the input pen 57 is positioned on the plane 59, the tablet 55 detects x- and y-coordinates of the position of the input pen 57. The coordinates of the position are sent to the normalizer 14 as the first electric signals $E_l$. For this purpose, the illustrated tablet 55 comprises first and second resistant sheets 61 and 62. The first resistant sheet 61 has a pair of first electrodes 66 which are extended parallel to each other in a direction of the y-axis and which are spaced apart from each other in a direction of the x-axis. The first electrodes 66 are individually grounded. Likewise, the second resistant sheet 62 has second electrodes 67 which are extended parallel to each other in a direction of the x-axis and which are spaced apart from each other in a direction of the y-axis. Both of the second electrodes 67 are individually grounded.

The input pen 57 is driven by an a.c. voltage supplied from an a.c. voltage source 68. The first and the second resistant sheets 61 and 62 are electrostatically coupled to the input pen 57. As a result, an electric current flows through the first electrodes 66 and through the second electrodes 67. In this event, the electric current flowing through both of the first electrodes specifies the x-coordinate of the input pen 57. Similarly, the electric current flowing through both of the second electrodes specifies the y-coordinate of the input pen 57. Therefore, it is possible to detect the position of the input pen 57 by monitoring the electric current of each of the first and the second electrodes 66 and 67. Thus, the electric current may be sent as the first electric signal $E_l$ to the normalizer 14.

From the above, it is readily understood that each stenograph can be converted into the first electric signal $E_l$ by the use of the illustrated digitizer. Practically, the stenograph-to-electric conversion is carried out either at every stenograph or at a group of the stenographs. In order to indicate the beginning of the conversion, a start signal may be sent from the digitizer to the pattern generator 17.

Any other digitizers can be used to convert the stenographs into the first electric signals $E_l$. For example, the digitizer may be of an electromagnetically coupled type. Alternatively, the first electric signals may be derived from the input pen 57.

While this invention has thus far been described in conjunction with a few embodiments thereof, it will readily be possible for those skilled in the art to put this invention into practice in various other manners. For example, stenographs may mechanically be written down. In this event, it is possible to simplify the stenograph-to-letter converter 16, the pattern generator 17, and the like. The first electric signals $E_l$ may be supplied direct to the processor 15 without passing through the normalizer 14. It is needless to say that shorthand used in this invention is not restricted to the Pitman shorthand. The second electric signals $E_2$ may be converted into voice signals again and may be processed to translate the speech into the other language. The second electric signals may be recorded or printed on a recording sheet by the use of a printer.

What is claimed is:

1. A speech processing system comprising stenograph signal producing means for producing a sequence of stenograph signals representative of a sequence of stenographs, respectively, and processing means coupled to said stenograph signal producing means for processing said stenograph signal sequence into an output signal, said stenograph signal producing means comprising:
   a stationary support with a writing zone and an extension zone being defined relative thereto;
   a recording medium;
   drive means for transporting said recording medium relative to said support along a transport direction in sequence through said writing zone and said extension zone, whereby said stenograph sequence is manually written on said recording medium at said writing zone;
   a movable support;
   guide means for enabling movement of said movable support over and adjacent to said recording medium along said transport direction in said writing zone;
   manually operable means for producing a drive signal upon manual operation thereof;
   said drive means being electrically coupled to said manually operable means for driving said recording medium along said transport direction in response to said drive signal so as to move said recording medium towards said writing zone; and
   scanning means placed over said recording medium at said extension zone for reading said stenograph sequence on said recording medium to produce a sequence of first electric signals adopted to be provided as said stenograph signal sequence to said processing means.

2. A speech processing system as claimed in claim 1, wherein said processing means comprises:
   normalizing means coupled to said scanning means for normalizing said first electric signals into a sequence of normalized signals, respectively;
   pattern storage means for storing a plurality of reference signals representative of patterns corresponding, respectively, to said stenographs;
   comparing means coupled to the normalizing means and the pattern storage means for comparing each of said normalized signals with the stored plurality of reference signals to detect coincidence between said normalized signals and said reference signals, and to produce an intermediate electric signal corresponding to a reference signal detected by the comparing means to be coincident with a normalized signal; and
   output means for producing said intermediate electric signal as said output signal.

3. A speech processing system as claimed in claim 2, wherein said output means comprises:
    converting means coupled to said comparing means for converting said intermediate electric signal into a word signal indicative of a word specified by said intermediate electric signal; and
    display means coupled to said converting means for visually displaying said word signal as said output signal.

4. A speech processing system as claimed in claim 3, wherein said output means comprises:
    converting means coupled to said comparing means for converting said intermediate electric signal into a word signal indicative of a word specified by said intermediate electric signal;
    display means coupled to said converting means for visually displaying said word signal to provide a visual display corresponding to said word; and
    copying means coupled to said display means for copying said visual display on a predetermined copy sheet to visually display said output signal.

5. A speech processing system as claimed in claim 2, wherein said output means comprises:
    recording means for recording said intermediate electric signal on a preselected recording medium to produce said output signal.

6. A speech processing system as claimed in claim 4, wherein said intermediate electric signal is indicative of a phonetic character;
    said converting means comprising means for supplying said intermediate electric signal to said display means without conversion of said intermediate signal for causing said display means to display said phonetic character as said output signal when said converting means cannot convert said intermediate electric signal into said word signal.

* * * * *

UNITED STATES PATENT AND TRADEMARK OFFICE
CERTIFICATE OF CORRECTION

PATENT NO. : 4,985,929

DATED : January 15, 1991

INVENTOR(S) : Chizuko TSUYAMA

It is certified that error appears in the above-identified patent and that said Letters Patent is hereby corrected as shown below:

Title page, Section [56] References Cited, under "FOREIGN PATENT DOCUMENTS", change the German reference "1 231 220" to --2 311 220--.

Signed and Sealed this

Twenty-ninth Day of September, 1992

*Attest:*

DOUGLAS B. COMER

*Attesting Officer*     *Acting Commissioner of Patents and Trademarks*